United States Patent [19]

Fenton

[11] Patent Number: 4,589,388
[45] Date of Patent: May 20, 1986

[54] INTERNAL COMBUSTION ENGINE

[76] Inventor: John W. Fenton, 26 Shoreland Dr., Angler's Park Shores, Key Largo, Fla. 33037

[21] Appl. No.: 735,389

[22] Filed: May 17, 1985

[51] Int. Cl.⁴ ............................................. F02B 53/00
[52] U.S. Cl. .................................................... 123/241
[58] Field of Search ............................ 123/241; 418/68

[56] References Cited

U.S. PATENT DOCUMENTS 2,173,663 9/1939 Raymond ............................ 123/241
3,156,222 11/1964 Miller .................................. 123/241

*Primary Examiner*—Douglas Hart
*Attorney, Agent, or Firm*—Dunlap, Codding & Peterson

[57] ABSTRACT

A vane support ring is mounted within a housing to rotate about its axis and support vanes which pivot about diameters of the vane support ring and divide the interior of the housing into two chambers. Drive shafts, pivotally attached to the vanes, extend through drive shaft apertures formed through the housing to coordinate pivotation of the vanes to rotation of the vane support ring so that the two chambers increase and decrease in volume with rotation of the vane support ring. Gases are introduced into the chambers via an inlet port and discharged from the chambers via an exhaust port that are opened and closed in coordination with vane support ring rotation by poppet valves and a cam ring geared to the vane support ring and extending about the poppet valves or, alternatively, by a slotted valve ring extending circularly about the housing and geared to the vane support ring. A spark plug or fuel injector mounted on the housing provides a combusting fuel in each chamber at minimum chamber volume.

14 Claims, 18 Drawing Figures

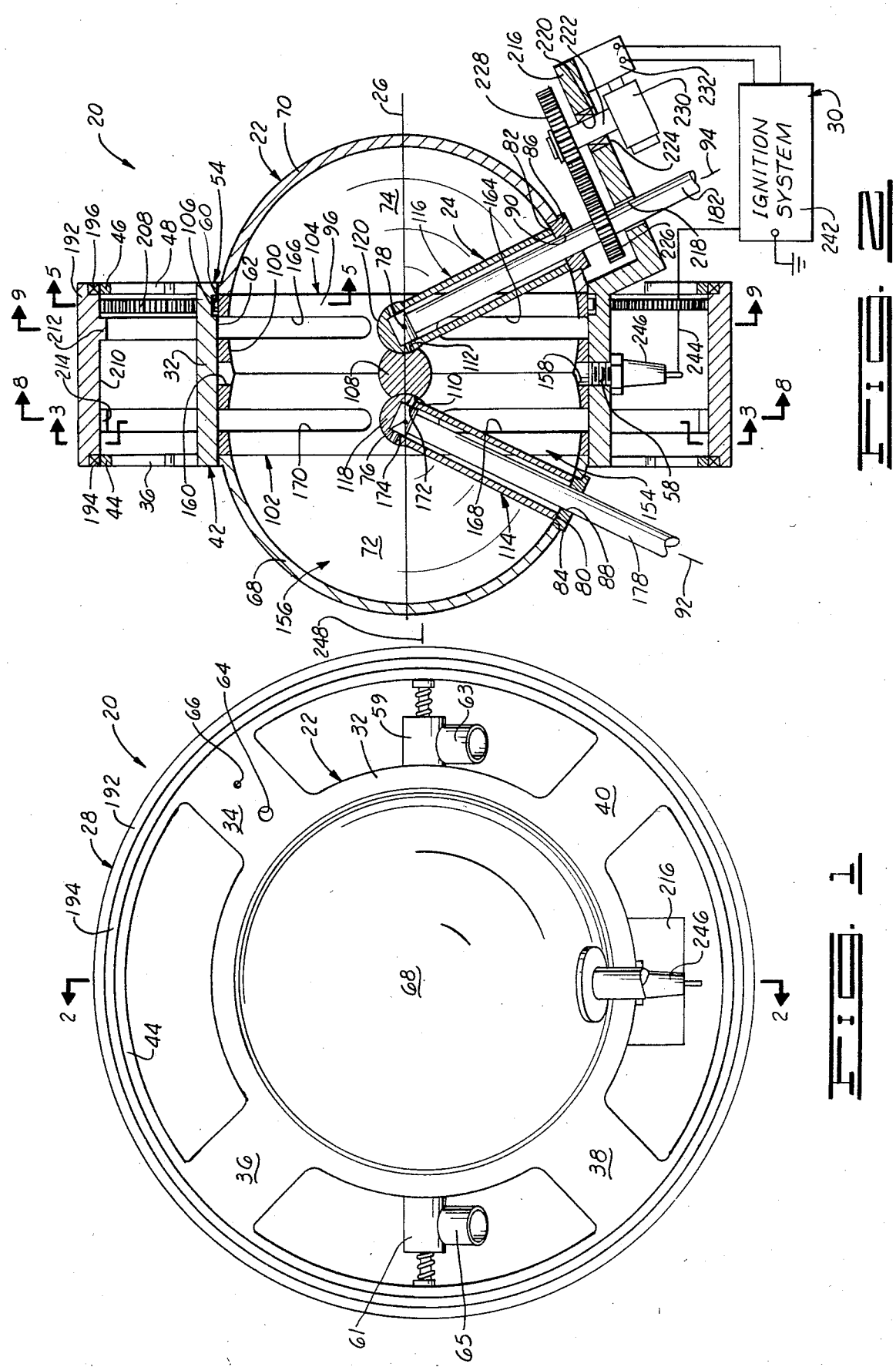

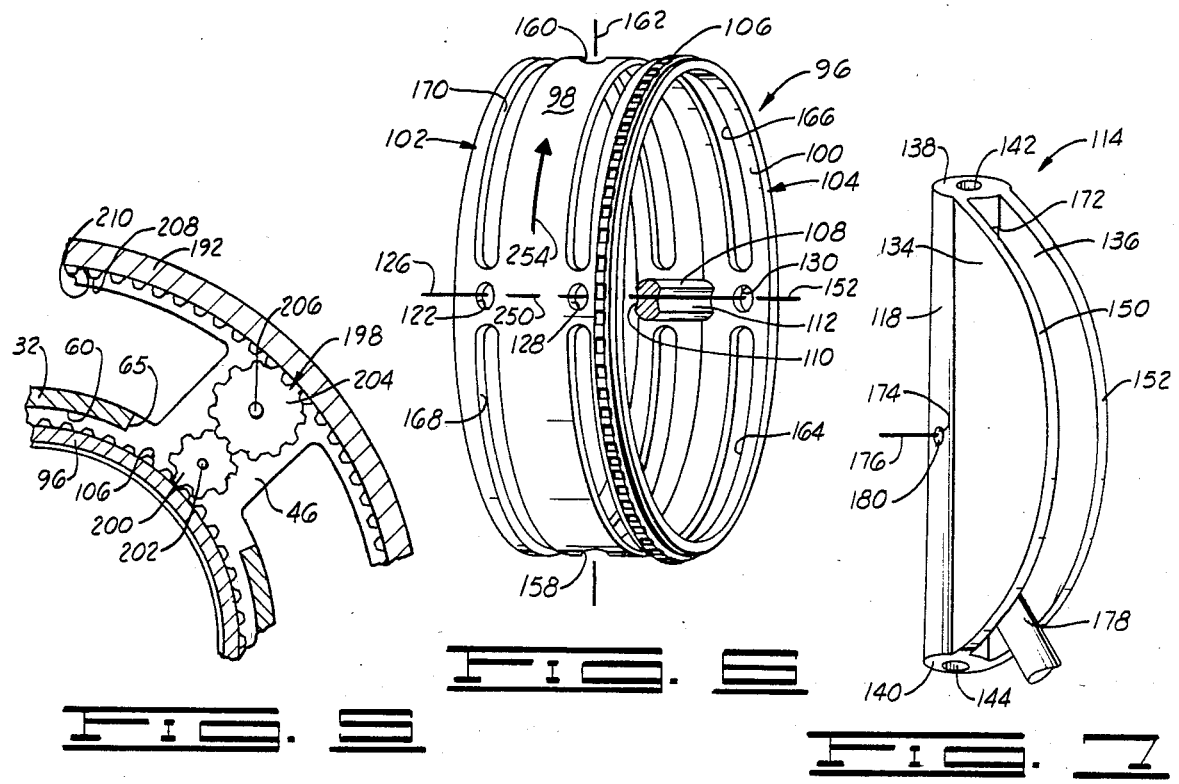
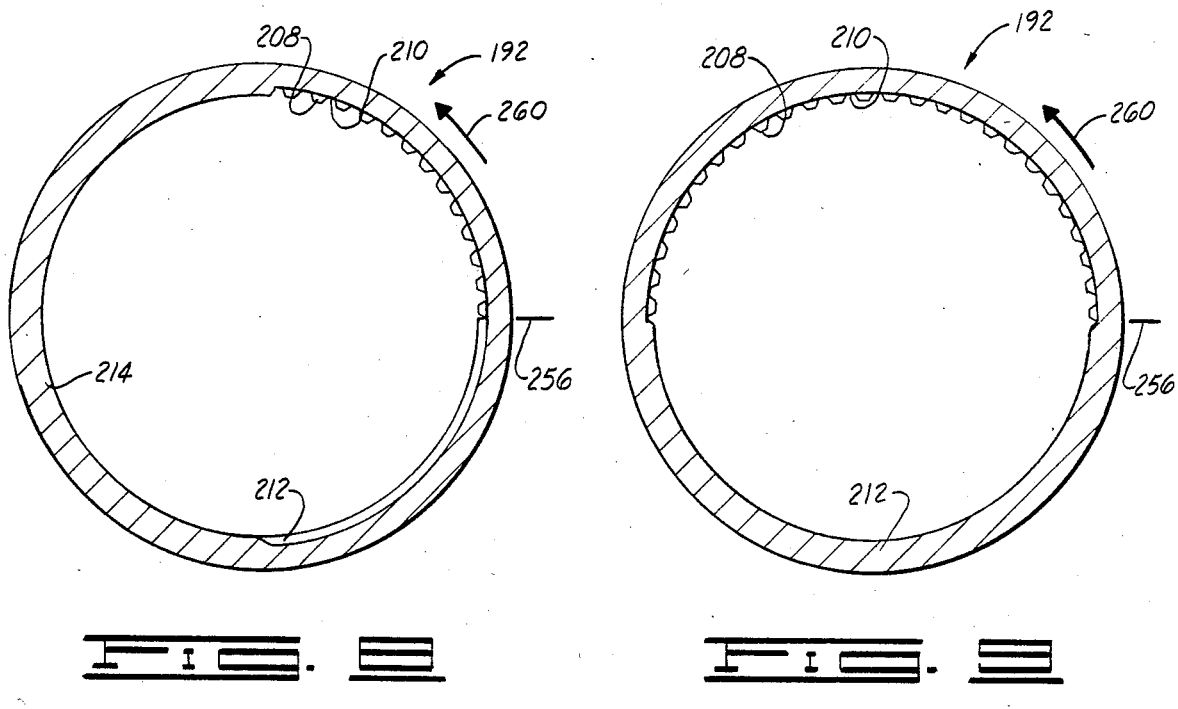

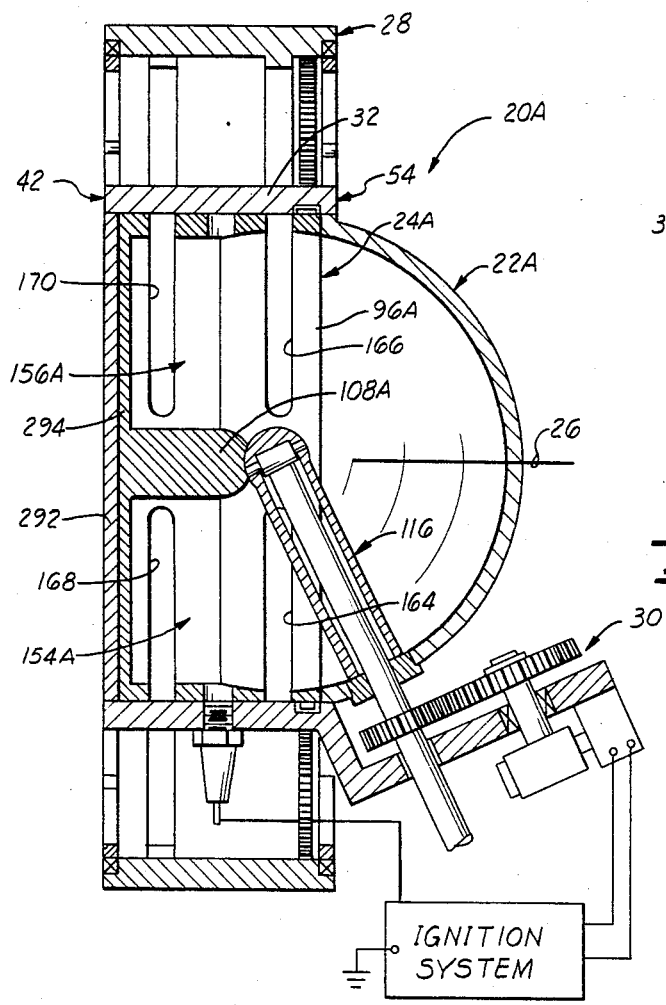
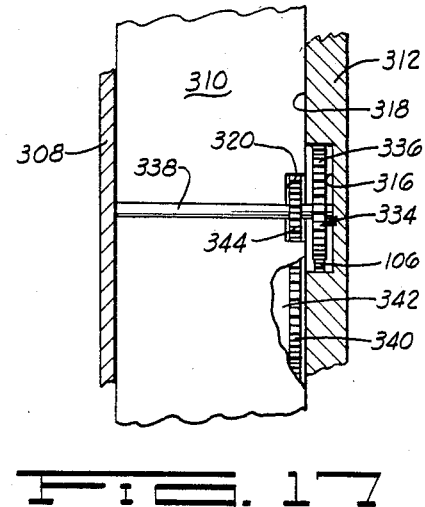
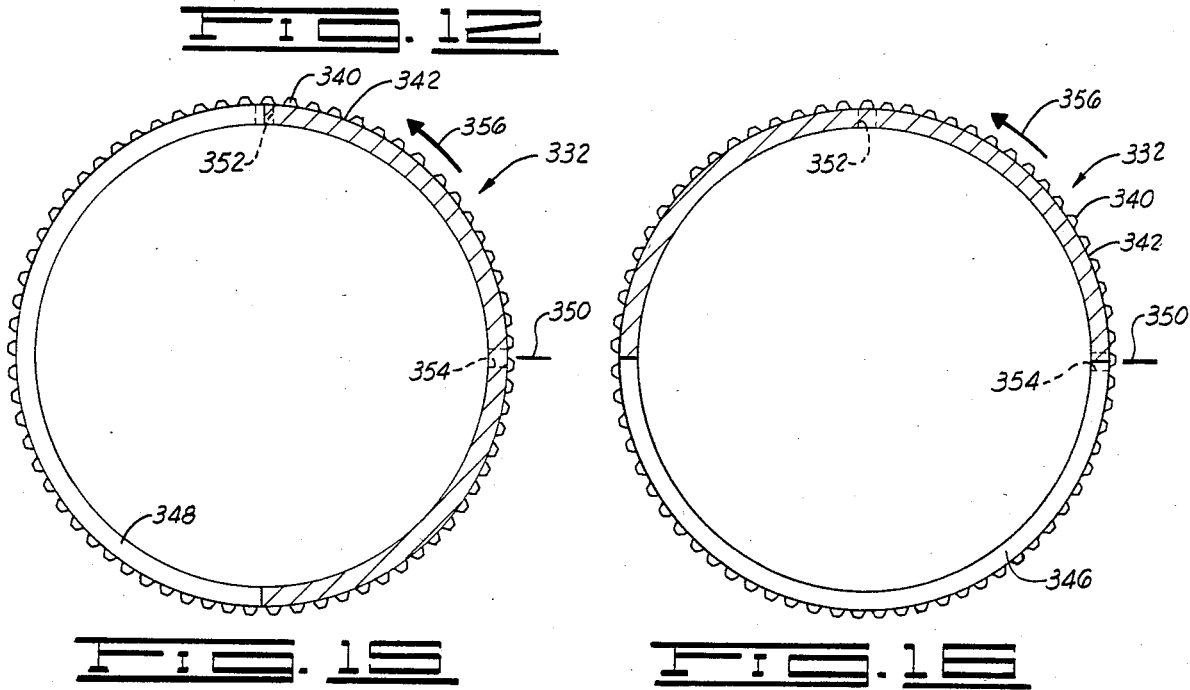
FIG. 12
FIG. 17
FIG. 13
FIG. 16

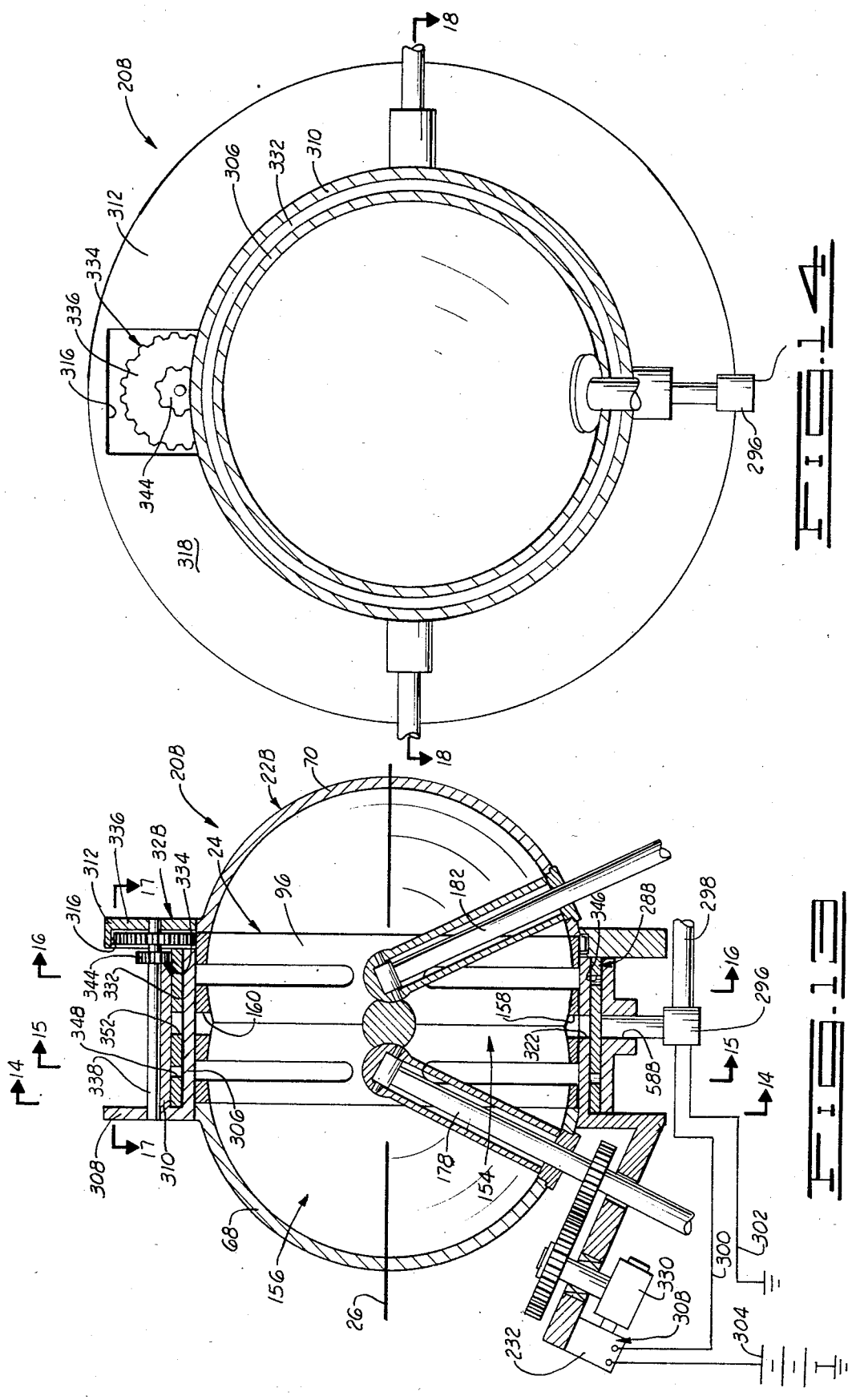

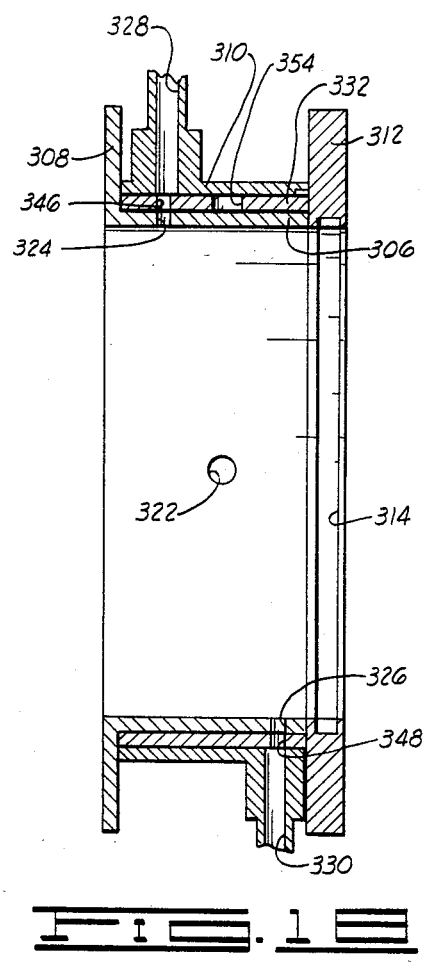

INTERNAL COMBUSTION ENGINE

CROSS REFERENCE TO RELATED APPLICATION

The subject matter of this United States patent application is related to the subject matter of United States patent application, Ser. No. 537,934, filed Sept. 30, 1983, now U.S. Pat. No. 4,519,756, and entitled CONSTANT DISPLACEMENT TURBINE WITH VANE WHICH PIVOTS AND ROTATES.

BACKGROUND OF THE INVENTION

The present invention relates generally to improvements in internal combustion engines and, more particularly, but not by way of limitation, to four cycle internal combustion engines.

In my co-pending U.S. patent application, Ser. No. 537,934 entitled CONSTANT DISPLACEMENT TURBINE WITH VANE WHICH PIVOTS AND ROTATES, the teachings of which are hereby incorporated by reference, I have disclosed a turbine in which vanes are pivotally mounted on a rotating vane support ring within a housing and sealing surfaces are formed on edges of the vane in contact with the interior of the housing so that the vanes define two chambers within the housing. Drive shafts are pivotally attached to the vanes and extend through drive shaft apertures formed through the housing to coordinate the pivotation of the vanes with the rotation of the vane support ring so that the two chambers increase and decrease in volume as the vane support ring rotates within the housing. Inlet and outlet ports are formed through the housing so that a pressurized gas may be injected into the inlet port, to enter the chamber currently having a low volume, while gases are exhausted from the other chamber, currently having a high volume, via the outlet port. By this means, the invention described in my aforementioned United States patent application provides a turbine having all of the advantages of turbines over other types of engines while eliminating a basic disadvantage of the turbine; that is, a lack of closed combustion chambers normally found in a turbine.

While the invention described in my co-pending United States patent application referred to above thus provides a major advance in the art of heat engines, it is still recognized that there are circumstances in which a conventional four cycle engine is advantageous. The present invention extends the teachings of my above-referenced United States patent application to provide a four cycle engine that includes many of the advantages provided by the turbine taught in such application.

SUMMARY OF THE INVENTION

The engine of the present invention is comprised of a housing having one or more lobes positioned about a lobe axis extending through the housing in the same manner as the turbine taught in my above-referenced United States patent application. Each lobe has an inner surface that is shaped to conform to a portion of a spherical surface centered at a lobe center on the lobe axis and the engine includes a vane assembly that is mounted in the housing to rotate about the lobe axis. The vane assembly includes one vane for each lobe of the housing and such vane is mounted on a vane support ring, forming a portion of the vane assembly, to pivot on the vane support ring while the vane support ring rotates about the lobe axis. A sealing surface is formed in an arc between the ends of the vane, to mate with the inner surface of the lobe with which the vane is associated, and fluid communication between the sides of the vane is blocked so that the vane, or vanes, divide the interior of the housing into two combustion chambers. A drive shaft is pivotally connected to each vane to pivot about an axis perpendicular to the vane pivotation axis at the lobe center and the drive shaft passes through an aperture in the housing along a radius of the lobe, associated with the vane to which the drive shaft is attached, that is disposed at an angle to the lobe axis. The drive shaft thus provides a constraint on movement of the vane within the housing and such constraint coordinates the pivotation of the vane with the rotation of the vane assembly such that, for each half rotation of the vane assembly, one combustion chamber formed by the vane disposed generally to one side of the housing must expand while the other chamber contracts. Porting to these chambers is positioned to permit intake of air into the chamber nearest one side of the housing while exhausting the chamber nearest the opposite side of the housing. The air can entrain a fuel and, in such case, a spark plug is provided in a well on the housing to ignite the fuel in each combustion chamber at substantially minimum volume of the chamber. Alternatively, a fuel injector can be mounted in the well to inject fuel into each chamber at substantially minimum volume of the chamber. In either case, a gear and cam system can be provided to coordinate the energization of the spark plug or the operation of the fuel injector with the rotation of the vane support ring within the housing.

In order to operate the engine as an internal combustion engine, a valving assembly is provided to open and close the inlet and outlet ports of the housing in coordination with the rotation of the vane support ring within the housing. In one embodiment of the invention, the valving assembly takes the form of poppets disposed in the inlet and outlet ports and a cam ring that is rotatably mounted on the housing to extend in a circle about the poppets, the cam ring having ridges formed thereon to engage the poppets and force the poppets inwardly for selected positions of the cam ring on the housing. A gear assembly is provided between the cam ring and the vane support ring to open and close the poppets in coordination with the rotation of the vane support ring within the housing so that air can be introduced into each chamber during expansion of the chamber and exhaust gases can be discharged from each chamber during contraction of each of the combustion chambers.

In a second embodiment of the engine, the valving assembly takes the form of a slotted valve ring mounted on the housing to extend in a circle thereabout with the slots in the valve ring being axially positioned to align with the inlet and outlet ports of the housing. As in the case of the cam ring of the first embodiment, the valve ring is mechanically coupled to the vane support ring so that a slot in the valve ring can be aligned with the inlet port of the housing at times that one of the combustion chambers is expanding and a second slot through the valve ring can be aligned with the outlet port at times that one of the combustion chambers is contracting to coordinate injection and discharge of gases into and from the combustion chambers with expansion and contraction of the chambers that will occur with rotation of the vane support ring. By including either the spark plug or the fuel injector referred to above, expansion and contraction of the two combustion chambers can be caused to be driven by a burning fuel within the combustion chambers to drive the vane support ring in circular motion and, coordinately, to rotate the drive shafts via the coupling of the vanes to the vane support ring. By this means, the engine is provided with expanding and contracting combustion chambers, without pistons which must reciprocate and thereby periodically come to rest, to provide an internal combustion engine having a high efficiency of operation. Similarly, since the two combustion chambers are formed by dividing the interior of the housing into two chambers, via the vanes, the present invention permits the construction of an internal combustion engine which is characterized by small size and, consequently, low weight, such benefit stemming from the use of portions of the interior of the housing alternatively as portions of one of the combustion chambers and then as portions of the other of the combustion chambers.

An object of the present invention is to provide an internal combustion engine having a mechanical construction providing the engine with a high efficiency of operation.

Another object of the present invention is to provide an internal combustion engine having a small size and, consequently, low weight in comparison with delivered horsepower.

Other objects, advantages and features of the present invention will become clear from the following detailed description of preferred embodiments of the invention when read in conjunction with the drawings and appended claims.

BRIEF DESCRIPTION OF THE DRAWINGS

FIG. 1 is an end elevational view of an internal combustion engine constructed in accordance with the present invention.

FIG. 2 is a cross section of the engine shown in FIG. 1 taken along line 2—2 of FIG. 1.

FIG. 5 is a partial cross section of a portion of the engine on an enlarged scale illustrating the cam drive assembly of the engine.

FIG. 6 is an isometric view of the vane support ring of the engine.

FIG. 7 is an isometric view of a vane of the engine.

FIGS. 8 and 9 are cross sectional views of the cam ring taken along lines 8—8 and 9—9 of FIG. 2 respectively.

FIG. 12 is an elevational cross section, similar to FIG. 2, of a second embodiment of the engine.

FIG. 13 is a cross section, similar to FIG. 2, of a third embodiment of the engine.

FIG. 14 is a cross section of the engine shown in FIG. 13 taken along line 14—14 of FIG. 13.

FIGS. 15 and 16 are cross sections of the valve ring of the engine shown in FIG. 13 taken along lines 15—15 and 16—16 respectively.

FIG. 17 is a partial cross section in enlarged scale taken along line 17—17 of FIG. 13.

FIG. 18 is a cross section of the housing of the engine shown in FIG. 13 taken along line 18—18 of FIG. 14.

BRIEF DESCRIPTION OF FIGS. 1 THROUGH 10

Figure 3:
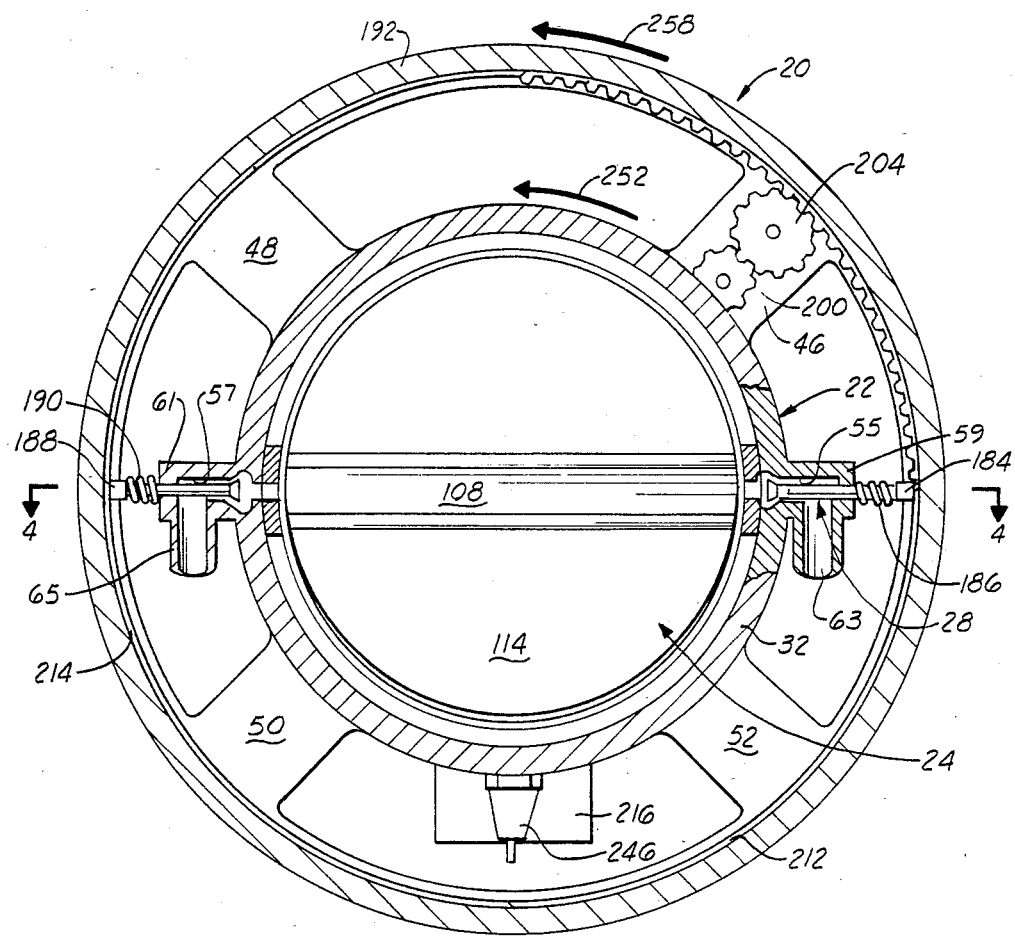
FIG. 3 is a cross section of the engine taken along line 3—3 of FIG. 2.
Figure 4:
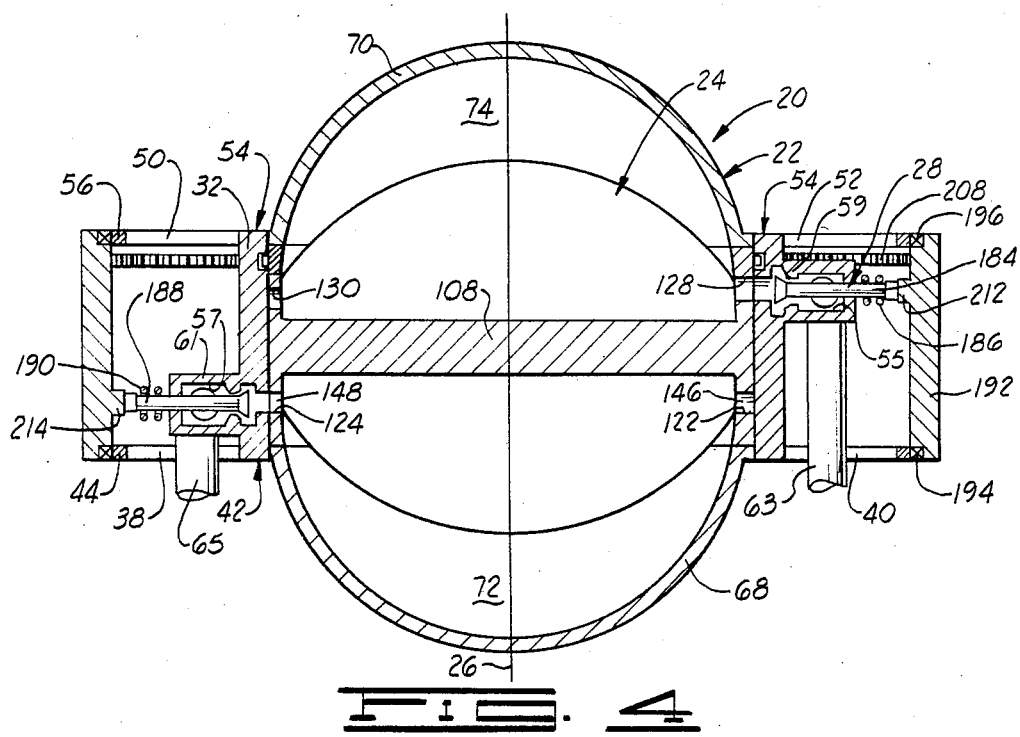
FIG. 4 is a cross section of the engine taken along line 4—4 of FIG. 3.

Referring now to FIGS. 1 through 11 in general and to FIGS. 1 through 4 in particular, shown therein and designated by the general reference numeral 20 is one preferred form of an internal combustion engine constructed in accordance with the present invention. In general, the engine 20 is comprised of a housing 22 in which is supported a vane assembly 24 that rotates within the housing 22 about a lobe axis 26 extending from end-to-end through the housing 22 as shown in FIGS. 2 and 4. Additionally, the engine 20 comprises a valving assembly 28 and an ignition assembly 30 which has been particularly shown in FIGS. 2 and 10.

Referring first to the housing 22, the housing 22 is comprised of a tubular housing center section 32 that extends in a circle centered on the lobe axis 26. A plurality of webs 34–40 are formed integrally with the housing center section 32 to extend radially therefrom at a first end 42 of the housing center section 32 and support a bearing support ring 44 concentrically with the housing center section 32. Similarly, a plurality of webs 46–52 are formed integrally on the housing center section 32 to extend radially outwardly from a second end 54 of the housing center section 32 to support a second bearing support ring 56 concentrically about the second end 54 of the housing center section 32 and in axial alignment with the bearing support ring 44. The purpose of the bearing support rings 44 and 56 will be discussed below.

As particularly shown in FIGS. 3 and 4, the housing 22 is provided with an inlet port 55 at one side of the housing center section 32 and the inlet port 55 is positioned adjacent the end 54 of the housing center section 32. Similarly, an outlet port 57 is formed in the diametrically opposite side of the housing center section 32, adjacent the first end 42 of the housing center section 32, so that the inlet and outlet ports, 55 and 57 respectively, are axially offset on the housing center section 32. The purpose of such offset will become clear below. As shown in the drawings, the inlet ports 55 and 57 are formed in projecting members, 59 and 61 respectively, to which tubes, 63 and 65 respectively, can be connected for the introduction and exhaust of gases into and from the housing 22.

Referring once again to FIG. 2, a threaded well 58 is formed through the bottom of the housing center section 32, angularly midway between the ports 55 and 57, a groove 60 is formed in the interior surface 62 of the housing center section 32 to extend circularly about the lobe axis 26 and a slot 64 (FIG. 5) is formed through portions of the housing center section 32 adjacent the web 46 to intersect the groove 60. As shown in FIG. 1, holes 64 and 66 are formed through the web 34, parallel to the lobe axis 26 and corresponding holes (not shown) are formed through the web 46 coaxially with the holes 64 and 66.

The housing 22 is further comprised of first and second hemispherical lobes, 68 and 70 respectively, that are mounted within the housing center section 32, at the ends 42 and 54 respectively thereof, to extend symmetrically about the lobe axis 26 as particularly shown in FIGS. 2 and 4. The interior surfaces 72 and 74 of the lobes 68 and 70, respectively, are each shaped to conform to a portion of a spherical surface centered on lobe centers 76 and 78, on the lobe axis 26, for the lobes 68 and 70 respectively. Apertures 80 and 82 are formed through the lobes 68 and 70 respectively, between the lobe axis 26 and the well 58 to receive bearings, 84 and 86 respectively, having drive shaft apertures 88 and 90 formed therethrough about drive shaft axes 92 and 94 that extend radially from the lobe centers, 76 and 78 respectively.

The vane assembly 24 is comprised of a vane support ring 96 that is positioned within the housing center section 32 to extend in a circle along the inner surface 62 of the housing center section 32 between the lobes 68 and 70 so that the vane support ring is supported by the housing center section 32 and axially positioned therein by the lobes 68 and 70. The construction of the vane support ring 96 has been particularly shown in FIG. 6 to which attention is now invited.

As shown in FIG. 6, the vane support ring 96 is generally tubular in form so that the vane support ring has an outer periphery 98, an inner periphery 100 and planar first and second ends, 102 and 104 respectively, which intersect the inner and outer peripheries 98 and 100. Near the second end 104, and on the outer periphery 98, a gear ring 106 is formed on the outer periphery 98 of the vane support ring to extend, as shown in FIG. 2, into the groove 60 in the inner periphery 62 of the housing center section 32. The purpose of the gear ring 106 will become clear below.

Extending diametrically across the center of the interior of the vane support ring 96, the vane support ring is provided with an integral bar-shaped seal member 108 having concave sides 110 and 112 facing the first and second ends 102 and 104 of the vane support ring 96. The vane assembly 24 is further comprised of vanes 114 and 116 (FIG. 2) having cylindrical portions 118 and 120 that mate with the concave sides 110 and 112 to form dynamic seals between portions of the vane support ring above the seal member 108 and portions of the vane support ring disposed below the seal member 108 for a purpose that will be discussed below.

In order to mount the vane 114 on the vane support ring 96, holes 122 and 124 (see FIG. 4) are formed through the vane support ring along a selected diameter 126 that parallels the seal member 108 adjacent the first end 102 of the vane support ring 96. The second vane 116 is similarly mounted via holes 128 and 130 formed through the vane support ring about a selected second diameter 132 that parallels the seal member 108 near the second side 104 of the vane support ring 96. As can be seen from the positions of the vanes 114 and 116 in FIG. 2, the diameters 126 and 132 pass through the lobe centers 76 and 78 respectively.

The construction of the vanes 114 and 116 has been particularly shown for the vane 114 in FIG. 7. In particular, the vane 114 is comprised of the cylindrical portion 118 from which laterally extend two spaced, parallel, semi-circular plates 134 and 136, the edges of the plates 134 and 136 each extending in an arc between the ends 138 and 140 of the cylindrical portion 118 of the vane 114. Holes 142 and 144 are formed in the ends 138 and 140 of the cylindrical portion 118 of the vane 114 so that the vane 114 can be mounted in the vane support ring 96 via pins 146 and 148 (FIG. 4) that extend from the holes 142 and 144 into the holes 122 and 124 of the vane support ring 96 respectively. The second vane 116 is constructed identically to the first vane 114 and is similarly mounted in the vane support ring 96 via pins (not numerically designated in the drawings) that extend from the ends (not numerically designated in the drawings) of the cylindrical portion 120 of the second vane 116 into the holes 128 and 130 formed through the vane support ring 96.

As shown in FIG. 2, the internal periphery 100 of the vane support ring 96 is configured such that portions of the periphery 100 between the center of the ring and the first end 102 thereof continue the spherical shape of the interior surface 72 of the first lobe 68 and, similarly, portions of the internal periphery 100 of the vane support ring 96 between the center of the vane support ring 96 and the second end 104 continue the spherical configuration of the interior surface 74 of the second lobe 70. Correspondingly, the edges 150 and 152 (FIG. 7) of the plates 134 and 136 and the ends 138 and 140 of the cylindrical portion 118 of the vane 114 are shaped to conform to a portion of a spherical surface so that the ends 138 and 140 and edges 150 and 152 form a sealing surface between the vane 114 and the lobe inner surface 72. An identical sealing surface is similarly formed between the vane 116 and the lobe inner surface 72. Thus, the vanes 114 and 116 and the sealing member 108 divide the interior of the housing 22 into a first combustion chamber 154 (FIG. 2) and a second combustion chamber 156 that are disposed to opposite sides of each of the vanes 114 and 116. A hole 158 is formed through lower central portions of the vane support ring 96 to open into the first combustion chamber 154 and a hole 160 is similarly formed through upper central portions of the vane support ring 96 into the second combustion chamber 156. As shown in FIG. 6, the holes 158 and 160 are formed along a diameter 162 of the vane support ring 96 that extends perpendicularly to the longitudinal extent of the sealing member 108 so that the holes 158 and 160 are displaced 90° from the holes 122, 128 and 130 by means of which the vanes 114 and 116 are mounted in the vane support ring 96.

In addition to the holes 158 and 160, the vane support ring 96 is provided with two intake slots, 164 and 166, that each extend substantially 180° between the holes 128 and 130 near the second end 104 of the vane support ring 96. As can be seen in FIG. 6, the intake slot 164 thus extends substantially 90° to either side of the hole 158 so that the intake slot 164 will open into the first combustion chamber 154 as shown in FIG. 2 and, similarly, the intake slot 166 opens into the second combustion chamber 156. Near the first end 102 of the vane support ring 96, the vane support ring 96 is similarly provided with two exhaust slots 168 and 170 which, like the intake slots 164 and 166, extend substantially 180° between the holes 122 and 124 provided for mounting the first vane 114 in the vane support ring 96 so that the exhaust slot 168 will open into the first combustion chamber 154 and the second slot 170 will open into the second combustion chamber 156 as has been shown in FIG. 2. When the vane support ring 96 is mounted within the housing 22, the axial position of the vane support ring 96 with respect to the lobe axis 26 is selected, via the mounting of the housing center section 32 between the lobes 68 and 70 within the housing center section 32, to axially align each of the intake slots 164 and 166 with the inlet port 55 into the housing 22 as has been indicated by the alignment of the hole 128, with which the slots 164 and 166 are aligned, with the inlet port 55 in FIG. 4. Similarly, the exhaust slots 168 and 170 are axially aligned, via the positioning of the vane support assembly 24 within the housing 22, with the outlet port 57 as indicated in FIG. 4 by the alignment of the hole 124 with the outlet port 57.

Referring now to FIGS. 2 and 7, a slot 172 is formed in the cylindrical portion 118 of the first vane 114 to extend nearly the length of the portion 118 and a hole 174 is formed through the cylindrical portion 118 perpendicularly to the longitudinal axis of the portion 118 and through the center of the portion 118. Thus, the hole 174 extends about an axis 176 (FIG. 7) that is perpendicular to the selected diameter about which the first vane 114 pivots on the vane support ring 96 and, additionally, passes through the lobe center 76 when the vane assembly 24 is mounted in the housing 22. A first drive shaft 178 is mounted between the two plates 134 and 136 of the first vane 114 for pivotation between the plates 134 and 136 via a pin 180 and the first drive shaft 178 is extended through the drive shaft aperture 88 when the engine 20 is assembled. A second drive shaft 182 (FIG. 2) is similarly mounted on the second vane 116 to extend through the second drive shaft aperture 90 when the vane assembly 24 is mounted within the housing 22. That is, the second drive shaft 182 will pivot within the vane 116 about an axis (not numerically designated in the drawings) that passes through the second lobe center 78 and is perpendicular to the selected diameter of pivotation of the second vane 116 on the vane support ring 96.

The selection of the pivotation axes of the vanes 114, 116 on the vane support ring 96 and the pivotation axes of the drive shafts 178 and 182 on the vanes 114 and 116, coupled with the passage of the drive shafts 178 and 182 through the drive shaft apertures 88 and 90, couples rotational motion of the vane support ring 96 to pivotation of the vanes 114 and 116 on the vane support ring 96 so that the combustion chambers 154 and 156 expand and contract as the vane support ring 96 rotates about the lobe axis 26 in a manner that has been described in my aforementioned United States patent application Ser. No. 537,934. In particular, should the vane support ring 96 be pivoted 180° from the position shown in FIGS. 2-4, the first combustion chamber 154 will expand and simultaneously move about the lobe axis 26 to the position shown for the second combustion chamber 156 while the second combustion chamber 156 will contract and simultaneously move about the lobe axis 26 to the position shown for the first combustion chamber 154 in FIG. 2. The movement and volume changes of the chambers 154 and 156 has been particularly described in my aforementioned United States patent application Ser. No. 537,934, the teachings of which are hereby incorporated by reference.

Coming now to the valving assembly 28, such assembly is comprised of a conventional poppet 184, referred to herein as the inlet poppet, mounted within the inlet port 55 and having a seat (not numerically designated in the drawings) formed thereon to mate with a seat (not numerically designated in the drawings) formed within the projecting member 59 to close the inlet 55 via a radially outwardly displacement of the poppet 184 from the lobe axis 26. A spring 186 is mounted on the shaft of the poppet 184 to bias the poppet 184 outwardly to a position in which the poppet 184 will close the inlet port 55. A similar poppet 188, referred to herein as the outlet poppet, is similarly mounted in the outlet port 57 of the housing 22 and is similarly biased radially outwardly from the lobe axis 26 by a spring 190 so that the outlet port 57 is similarly in a normally closed position but can be opened by moving the poppet 188 toward the lobe axis 26.

Movement of the poppets 184 and 188 radially inwardly, with respect to the lobe axis 26, is effected by a cam ring 192 that is mounted on the housing 22 to extend about the housing center section 32 in a manner shown in FIGS. 1-4. In particular, bearings 194 and 196 are mounted on the bearing support rings 44 and 56 and the cam ring 192 is mounted on the bearings 194 and 196 so that the cam ring 192 extends in a circle about the housing 22 and is centered on the lobe axis 26 for rotational movement about the lobe axis 26.

Movement of the cam ring 192 about the housing center section 32 is coordinated with movement of the vane support ring 96 about the lobe axis 26 via a cam drive assembly 198 shown in FIG. 5. As shown therein, the cam drive assembly 198 is comprised of a first gear 200 that is mounted on a shaft 202 whose ends are supported in the hole 64 (FIG. 1) formed through the web 34 and the corresponding hole (not shown) formed through the web 46. Portions of the first gear 202 pass through the slot 65 formed through the housing center section 32 to mate with the gear ring 106 that is formed on the exterior surface of the vane support ring 96 so that rotation of the vane support ring 96 will cause rotation of the first gear 200. A second gear 204 is mounted on a shaft 206 via the hole 66 (FIG. 1) formed through the web 34 and the corresponding hole (not shown) formed through the web 46, such holes being positioned so that the teeth of the second gear 204 will mate with the teeth of the first gear 200. A gear ring 208 is then formed on the cylindrical inner periphery 210 to mesh with the teeth of the second gear 204 so that a rotation of the first gear 200 caused by a rotation of the vane support ring 96 is transmitted through the second gear 204 to the cam ring 192. As shown in FIG. 5, the second gear 204 is made substantially twice the size as the first gear 200 so that the cam ring 192 will rotate at one-half the speed of the vane support ring 96, for a purpose that will become clear below.

In order that rotation of the cam ring 192 can be utilized to open and close the poppets 184 and 188, semicircular ridges 212 and 214 are formed on the inner periphery 210 thereof as illustrated in FIGS. 2, 8 and 9. The ridge 212 is positioned on the surface 210 such that the ridge 212 will be axially aligned, along the lobe axis 26, with the inlet poppet 184 and the ridge 214 will be axially aligned with the outlet poppet 188 as can be seen in FIG. 4. As can be seen in FIGS. 8 and 9, the ridge 214 is angularly offset from the ridge 212 and such offset is utilized to time the opening and closing of the inlet port 55 and the outlet port 57 in a manner that will be discussed below.

Figure 10:
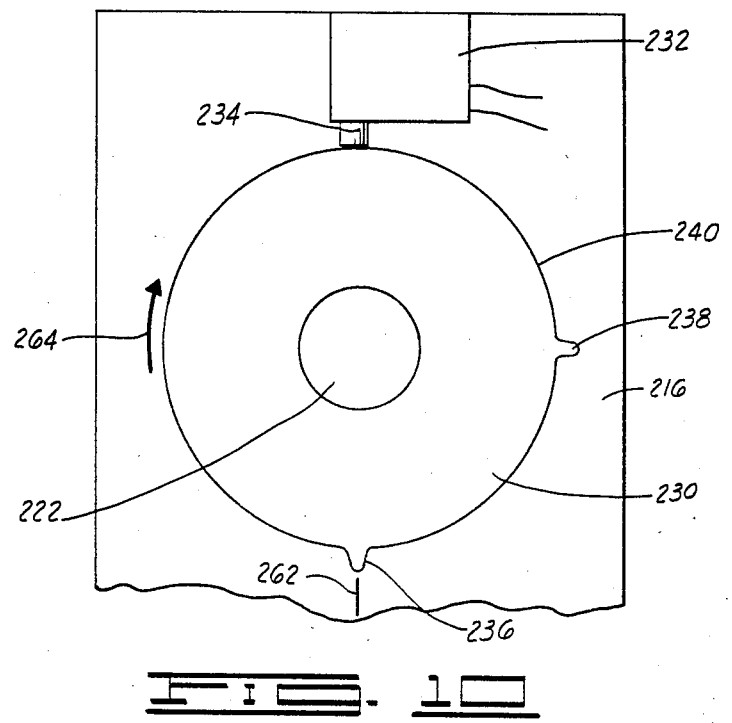
FIG. 10 is an elevational view of the ignition cam of the engine.

The ignition system 30 has been partially illustrated in FIG. 2 and partially illustrated in FIG. 10. Referring first to FIG. 2, the ignition assembly 30 is mounted on an L-shaped flange 216 that extends from lower portions of the housing center section 32 to receive the second drive shaft 94 through a hole 218 formed through the flange 216. A second hole 220 is formed through the flange 216 to support a stub shaft 222, via a bearing 224, parallel to the second drive shaft 94. The ignition assembly 30 then includes a first gear 226 mounted on the second drive shaft 94 and a second gear 228 mounted on the stub shaft 222 to mesh with the first gear 226 so that rotation of the drive shaft 94 will cause a coordinate rotation of the stub shaft 222. In particular, the second gear 228 is provided with twice the number of teeth as the first gear 226 so that the stub shaft 222 will rotate at one-half the speed of the drive shaft 94. A cam 230, more particularly illustrated in FIG. 10 is mounted on the stub shaft 222 and a switch 232 is mounted on the flange 216 adjacent the cam 230. The switch 232 has an actuating member 234 so that the switch 232 can be actuated by passage of either one of two projections 236 and 238 formed on the outer periphery 240 of the cam 230. Electrical leads from the switch 232 electrically connect the switch 232 to a conventional ignition system 242 that will produce a high voltage pulse of electricity on a conductor 244 each time the switch 232 is actuated. As shown in FIG. 2, the conductor 244 is connected to the central post of a spark plug 246 that is mounted in the well 58 formed through the housing center section 32. As also shown, the ignition system is grounded in a conventional manner and the housing 22 is similarly grounded so that the pulse on the conductor 244 will produce a spark between conventional contacts of the spark plug 246.

OPERATION

In order to discuss the operation of the engine illustrated in FIGS. 1-10, it will be useful to define zero positions of the vane assembly 24 and the cam ring 192 with respect to the housing 22 and to define a zero position of the cam 230 with respect to the switch 232. Initially, a reference position on the housing 22 has been defined via the line 248 shown in FIG. 1 and a reference position on the vane assembly 24 is similarly defined by a line 250 marked on the vane support ring 96 in FIG. 6. The vane assembly 24 will be said to be at the zero position thereof at such times that the line 250 shown on the vane support ring 96 is positioned to the side of the housing 22 from which the line 248 extends and is aligned with the line 248. During operation of the engine 20 the vane support assembly 24 will rotate in the direction indicated by the arrows 252 and 254 in FIGS. 3 and 6 respectively and the position of the vane assembly at any time during the operation of the engine 20 can be specified by stating that the vane assembly is at a particular angle, such angle being an angle of rotation of the vane support ring in the directions indicated by the arrows 252 and 254 away from the zero position of the vane assembly 24 within the housing 22. This angle will be the angle, in the directions 252 and 254, between the reference lines 248 and 250.

Similarly, the cam ring zero position is defined with respect to the reference position, indicated by the line 248 in FIG. 1, of the housing 22 with a reference position of the cam ring being indicated by the line 256 in FIGS. 8 and 9. During operation of the engine the cam ring 192 rotates about the housing 22 in the directions indicated by the arrow 258 in FIG. 3 and by the arrow 260 in FIGS. 8 and 9 so that the angular position of the cam ring 192 can similarly be described by stating that the cam ring 192 is at a specific angle with such angle being the angular separation between the lines 248 of FIG. 1 and 256 of FIGS. 8 and 9 in the direction 260. It will be noted in FIGS. 8 and 9 that the ridges 212 and 214 extend, with respect to the lines 256 and the directions 260 from 180° to 360°, for the ridge 212, and from 90° to 270°, for the ridge 214, on the interior periphery 210 of the cam ring 192.

The zero position for the cam 230 is defined with respect to the projection 236 on the periphery 240 of the cam 230 and the position of the actuating member 234 of the switch 232. In particular, the zero position of the cam 230 is a position in which the projection 236 is diametrically opposed to the actuator 234 as illustrated in FIG. 10, such position being shown and, further, being indicated by alignment of the projection 236 with a reference line 262 shown in FIG. 10. During operation of the engine 20, the cam 230 moves in a direction indicated by the arrow 264 shown in FIG. 10 and positions of the projection 236 are conveniently described with respect to the line 262 and the direction 264. That is, the position of the projection 236 can be specified by stating an angle of separation of the projection 236 from the line 262 shown in FIG. 10 in the direction 264 shown in such Figure. So described, the projection 236 is at 0° and the projection 238 is at 270° on the cam 230 when the cam is in the zero position shown in FIG. 10.

With these conventions in mind, the operation of the engine 20 can be understood by considering specific events that occur in the engine 20 as a function of the angular position of the vane support ring 96 within the housing 22. Accordingly, FIG. 11, which is a graph illustrating the operation of the engine, has been drawn with a lower axis 268 along which are plotted angles of rotation of the vane support ring from the zero position thereof, as defined above, in the housing 22. Additional axes 270-276 have been drawn parallel to the axis 268 to illustrate, respectively, intake of gases into one of the combustion chambers 154 and 156, exhaust of gases from one of the combustion chambers 154 and 156, ignition of gases in the chambers 154 and 156, and the delivery of power by the combustion of gases in the chambers 154 and 156 for angles of rotation of the vane support ring 96 shown along the axis 268. In order to illustrate events occurring in each of the combustion chambers 154 and 156, the graphs in FIG. 11 have been drawn to illustrate events taking place with respect to the first combustion chamber 154 above the lines 270-276 and events taking place with respect to the second combustion chamber 156 below the lines 270-276.

To initiate operation of the engine 20, each of the vane assembly 24, the cam ring 192 and the cam 230 are adjusted with respect to the housing 22 to be initially in the zero positions of these components of the engine 20 that have been discussed above. Such adjustment occurs once when the engine 20 is manufactured. Similarly, in order that fuel and air might be supplied to the combustion chambers 154 and 156, it is contemplated that the inlet pipe 63 will be connected to a carburetor (not shown) of any conventional type.

To discuss the operation of the engine, it will be useful to consider that the engine is initially in a state in which the vane assembly 24, the cam ring 192 and the cam 230 are all in the zero positions which have been illustrated in the drawings. In such position, the leading edge of the ridge 212 will be in alignment with the reference mark 256 shown in FIG. 9 so that the ridge 212 will engage the poppet 184 to force the poppet radially inwardly toward the lobe axis 26 resulting in opening of the intake port 55. Similarly, the ridge 214 will extend in an arc of substantially 180° opposite the reference mark 256 shown in FIG. 8 so that the outer end of the poppet 188 will be engaged by the ridge 214 to force the poppet 188 radially inwardly toward the lobe axis 26 and open the outlet port 57.

Concurrently, the intake slot 164 that opens into the first combustion chamber 156 will be nearly in alignment with the intake port 55 while the exhaust slot 170, opening into the second combustion chamber 156, will be nearly in alignment with the outlet port 57. The projection 236 on the cam 230 will be displaced 180° from the actuator 234 of the switch 232 at this time as indicated in FIG. 10.

Operation of the engine is initiated by a suitable starter connected to one of the drive shafts 92, 94 in a conventional manner so that operation is initially commenced by turning such drive shaft to cause the vane support ring 96 to turn in the direction 254 shown in FIG. 6. As the vane support ring 96 begins to turn in the direction 254, portions of the intake slot 164 will be moved into angular alignment with the inlet port 55 and such angular alignment will continue for an angular displacement of the vane support ring 96 through an angle of 180°. As the vane support ring 96 moves through this initial 180°, the cam ring 192 will move through 90° in the direction 260 shown in FIG. 9, the 90° movement of the cam ring 192 occurring because of the 2:1 reduction in speed of the cam ring 192 with respect to the vane support ring 96 that has been discussed above. Accordingly, during the first 180° of angular movement of the vane support ring 96, the poppet 184 will be displaced inwardly by the ridge 212 so that the inlet port 55 remains open and, because of the angular extent of the intake slot 164, fluid communication will exist between the inlet port 55 and the first combustion chamber 154. Since, as described in my aforementioned U.S. patent application Ser. No. 537,934, the combustion chamber 154 will expand during rotation through 180°, a mixture of fuel and air will be drawn into the first combustion chamber 154 during the 180° rotation of the vane support ring 96 as illustrated by the portion 270 of the intake graph of FIG. 11.

Figure 11:
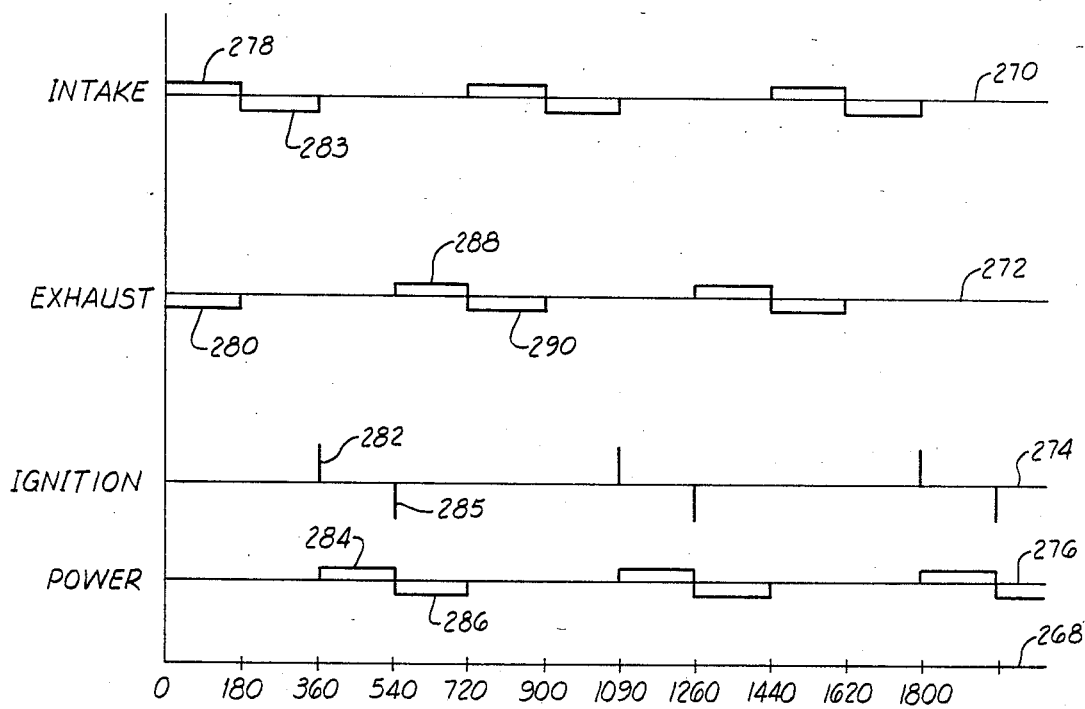
FIG. 11 is a graph illustrating the operation of the engine.

While the first combustion chamber 154 is thus intaking a fuel-air mixture, gases will be exhausted from the second combustion chamber 156 as indicated by the segment 280 of the exhaust graph shown on line 272 of FIG. 11. That is, the exhaust slot 170 will be aligned with the outlet port 57 and the ridge 214 will bear against the outer end of the poppet 188 to open the outlet port 57 thereby permitting the contraction of the second combustion chamber 156 caused, in the manner discussed in my aforementioned U.S. patent application Ser. No. 537,934, by rotation of the vane support ring 96 to expel gases through the exhaust slot 170 and the outlet port 57.

As the vane support ring 96 reaches the 180° position, the ridge 214 will have moved through 90° so that the trailing edge of the ridge 214 comes into alignment with the outer end of the poppet 188 permitting the poppet 188 to close the outlet port 57. Thereafter, and for a rotation of 180° of the cam ring 192, corresponding to 360° of rotation of the vane support ring 96, the outlet port 57 will remain closed so that neither combustion chamber 154 nor 156 may discharge gases via one of the exhaust slots 168, 170 and the outlet port 57.

However, because of the 2:1 speed reduction between the vane support ring 96 and the cam ring 192 and because of the placement of the ridge 212 on the cam ring 192 as shown in FIG. 9, the poppet 184 will continue to be forced inwardly for another 90° of rotation of the cam ring 192 (180° of rotation of the vane support ring 96) so that, between 180° and 360° of rotation for the vane support ring 96, the inlet port 55 will remain open. At the 180° position of the vane support ring 96, the second combustion chamber 156 will have moved to the position shown for the first combustion chamber 154 in FIG. 2 and, for the next 180° of movement of the vane support ring 96, the second combustion chamber 156 will move to its original position shown in FIG. 2 and expand so that the second combustion chamber 156 will draw a mixture of fuel and air from the inlet port 55 while the vane support ring 96 moves from 180° to 360°. Such intake has been indicated by the segment 283 of the intake graph along line 270 of FIG. 11. As the vane support ring 96 moves to the 360° position, the trailing edge of the ridge 212 will reach the zero mark 256 shown in FIG. 9 so that the inlet port 55 will be closed by movement of the poppet 184 under the influence of the spring 186.

Thus, as the vane support ring 96 reaches the 360° position, the first combustion chamber 154 will have returned to the position shown in FIG. 2 at which maximum compression of the gases therein will occur, both combustion chambers will be closed, and both combustion chambers 154 and 156 will contain a mixture of fuel and air to support combustion.

As the vane support ring 96 moves through this 360° angle, the 2:1 gear reduction described above for the cam ring 230 with respect to the vane support ring 96 will cause the cam 230 to move through 180° so that the projection 236 on the cam 230 will engage the actuator 234 of the switch 232 and actuate the switch 232 as the first combustion chamber returns to its original position. In response to the actuation of the switch 232, the ignition system 242 will momentarily provide a high voltage pulse on the conductor 244 to the spark plug 246 to ignite the fuel-air mixture in the first combustion chamber 154 via the hole 158 in the vane support ring 96 as indicated by the spike 282 on the ignition graph shown on the line 274 of FIG. 11. The ignition of the fuel-air mixture in the first combustion chamber 154 will thus give rise to pressures on the vanes 114 and 116 that will tend to expand the first combustion chamber 154 and thus continue the movement of the vane support ring 96 in the direction 252 shown in FIGS. 3 and 6. Thus, between 360° and 540° of rotation of the vane support ring 96, power will be delivered to the drive shafts by the combustion of gases in the first combustion chamber 154 as indicated by the portion 284 of the power graph along the line 276 shown in FIG. 11.

As the vane support ring 96 moves from 360° to 540°, the second combustion chamber 156 will move to the position shown for the first combustion chamber 154 in FIG. 2 so that the second combustion chamber 156 will have reached its minimum volume at substantially the 540° position of the vane support ring 96. During the movement of the vane support ring 96 from 360° to 540°, the cam 230 will move another 90° in the direction 264 shown in FIG. 10 so that the projection 238 will contact the actuator 234 of the switch 232 to cause the ignition system 242 to again provide a high voltage pulse to the spark plug 246 and ignite the gases in the second combustion chamber 156 via the hole 160 through the vane support ring 96. Such ignition, indicated by the spike 285 on the ignition graph of FIG. 11, will cause a delivery of power to the drive shafts 92 and 94 as the vane support ring 96 moves from 540° to 720° in the same manner that power is delivered to the drive shafts 92 and 94 by combustion of gases within the first combustion chamber 154 as the vane support ring 96 moves from 360° to 540°. Such delivery of power by combusting gases has been indicated by the portion 286 of the power graph shown in FIG. 11. Thus, power is delivered to the drive shafts 92 and 94, first from one combustion chamber and then from the other combustion chamber, during movement of the vane support ring 96 from 360° to 720°.

At the 540° position for the vane support ring 96, the cam ring 192 will have moved through 270° in the direction 260 from the positions shown in FIG. 8 and 9 so that the leading edge of the ridge 214 will have returned to a position diametrically opposed from the reference mark 256 in FIG. 8 with the result that the poppet 188 will become forced inwardly by the ridge 214 on the cam ring 192 to open the exhaust port 57 and maintain the exhaust port 57 open for another 180° of rotation of the cam ring 192; that is, for another 360° of rotation of the vane support ring 96. Simultaneously, the exhaust slot 168 opening into the first combustion chamber 154 will come into angular alignment with the outlet port 57 so that, while the vane support ring 96 moves between the 540° and 720° positions, the first combustion chamber 154 will be in fluid communication with the outlet port 57. Since, as discussed in my aforementioned U.S. patent application Ser. No. 537,934, movement of a chamber within the housing 22 from the position shown for the second combustion chamber 156 to the position shown for the first combustion chamber 154 in FIG. 2 will result in contraction of such chamber, the first combustion chamber 154 will be contracting during this angular movement of the vane support ring 96 to expel combustion products as indicated by the portion of the exhaust graph 288 on the line 272 in FIG. 11.

Moreover, because of the 2:1 reductions of the speeds of the cam ring 192 and the cam 230 with respect to the vane support ring 96, the vane support ring 96, the cam ring 192, and the cam 230 will all have returned to their zero positions as the vane support ring 96 reaches the 720° position which is equivalent to the zero position of the vane support ring 96. Thus, the ridge 214 will be disposed with respect to the reference line 256 as shown in FIG. 8 so that the ridge 214 will maintain the outlet port 57 open for another 180° of rotation of the vane support ring 96 for exhaust of the second combustion chamber 156 as indicated by the portion 290 of the exhaust graph shown on line 272 in FIG. 11. It will be noted that the section 290 corresponds to the section 280 so that sections of the exhaust graph shown on line 272 in FIG. 11 repeat every 720°. Similarly, since the cam ring 192 and the cam 230 turn through one revolution for every two revolutions of the vane support ring 96 and since the configuration of the engine 20 for the 720° position of the vane support ring 96 is the same as the configuration of the engine 20 for the 0° position of the vane support ring 96, portions of the intake, ignition and power graphs between 0° and 720° for the vane support ring 96 will repeat for succeeding intervals of 720° as has been illustrated in FIG. 11. Thus, for every 720° of rotation of the vane support ring 96, the first combustion chamber 154 will intake a mixture of fuel and air for 180° while, for such 180°, combustion products are discharged from the second combustion chamber 156, the second combustion chamber 156 will then intake a mixture of fuel and air for 180° while the mixture of fuel and air in the first combustion chamber 154 is compressed. With the completion of this 360° turn of the vane support ring 96, causing the first combustion chamber 154 to have a minimum volume, ignition occurs in the first combustion chamber 154 resulting in the delivery of power for a further 180° of rotation of the vane support ring 96 while the first combustion chamber 154 expands under the influence of combusting gases therein. At the conclusion of this 180° of revolution of the vane support ring 96, combustion takes place in the second combustion chamber 156 for a position of minimum volume of the second combustion chamber 156 to result in another period of power delivery for 180° of revolution of the vane support ring 96 while gases are exhausted from the first combustion chamber 154. Thereafter, the operation of the engine 20 repeats this cycle occurring for 720° of rotation of the vane support ring 96.

It will be noted that the delivery of power occurs for only 360° of each 720° of rotation of the vane support ring 96 rather than during the full 720° of rotation. In order to smooth the operation of the engine 20, it is contemplated that any conventional power smoothing device may be used with the engine 20. Thus, for example, fly wheels may be mounted on the drive shafts 92 and 96 or, alternatively, two or more of the engines 20 can be mechanically coupled and operated out of phase so that power is always delivered from the combination of the two engines.

DESCRIPTION OF FIG. 12

FIG. 12 is a cross section of a second embodiment of an engine, designated by the reference numeral 20A, constructed in accordance with the present invention. The engine 20A is comprised of many of the same components that comprise the engine 20 with some of such components being modified. Accordingly, components of the engine 20 that are found in unmodified form in the engine 20A will be referred to herein by the same reference numerals that have been used in the discussion above of the engine 20. Components which have been modified will be identified by the same reference numeral followed by the letter A.

With this numerical designation convention in mind, the engine 20A is comprised of a housing 22A that differs from the housing 22 of the engine 20 only in that the lobe 68 of the engine 20 is replaced by a circular plate mounted in the housing center section 32 adjacent the first end 42 thereof.

Correspondingly, the vane assembly 24A is comprised of only one vane 116 which is mounted on a modified vane support ring 96A to define combustion chambers 154A and 156A to opposite sides of the vane 116. In particular, the vane support ring 96A is comprised of a circular plate 294 that abuts the circular plate 292 of the housing 22A and the sealing member 108A that extends across the vane support ring 96A extends to the plate 294 so that the plate 294 and the sealing member 108A provide a seal between the combustion chambers 154A and 156A that is provided by the vane 114 in the engine 20. Fluid communication to these chambers is provided by the same intake and exhaust slots 164-170 that are found in the engine 20 and the engine 20A is provided with the same valving assembly 28 and the same ignition assembly 30 so that the engine 20A will operate in the same manner as the engine 20.

DESCRIPTION OF FIGS. 13 THROUGH 18

FIGS. 13 through 18 illustrate a third embodiment of an engine constructed in accordance with the present invention, such engine being designated by the numeral 20B in accordance with the same convention that has been used for the engine 20A. In the engine 20B, the housing 22B has been modified to enable the use in the engine 20B of a second embodiment of a valving assembly 28B and, further, the ignition assembly 30B has been modified to replace the spark plug 246 of the engine 20 with a fuel injector 296 that has been illustrated in FIGS. 13 and 14. Any conventional fuel injector can be utilized in the engine 20B and, for purposes of illustration, it is contemplated that the fuel injector 296 is a fuel injector that can be operated to inject a quantity of fuel into an engine from a fuel supply line 298 in response to an electrical pulse received by the fuel injector on conductors 300 and 302. Remaining portions of the ignition assembly 30B are identical to remaining portions of the ignition assembly 30; that is, portions of the ignition assembly 30 excluding the spark plug 246, and the switch 232 of the ignition 30B is connected between a battery 304, or other electrical energy source, and the fuel injector 296 as schematically indicated in FIG. 13. The vane assembly 24 of the engine 20B is similarly identical to the vane assembly 24 of the engine 20.

In the engine 20B, the housing 22B is comprised of a modified housing center section 32B and lobes 68 and 70 which are identical to the lobes 68 and 70 of the engine 20 and are mounted in the modified housing center section 32B in the same manner as the lobes 68 and 70 are mounted in the housing center section 32 of the engine 20 so that the lobes 68 and 70 position the vane assembly 24 within the engine 20B in the same manner that the vane assembly 24 is positioned within the housing 22 of the engine 20. Accordingly, it will not be necessary to further consider the interaction between the vane assembly 24 and the lobes 68 and 70 in the engine 20B for purposes of the present disclosure.

In the engine 20B, the housing center section 32B is constructed of a tubular member 306 that extends about the vane support ring 96 and has a flange 308 extending radially outwardly from one end thereof. A second tubular member 310 is formed integrally with the tubular member 306 and the flange 308 to extend concentrically about the tubular member 306 and thereby provide an annular space extending in a circle and centered on the lobe axis 26. This annular space receives a portion of the valving assembly 28B as will be discussed below. The housing center section 32B further comprises a flange 312 that is attached by any suitable means to the distal ends of the tubular members 308 and 310 to extend radially away from the lobe axis 26 parallel to the flange 308 as shown in FIG. 13. A groove 314 (FIG. 18) is formed on the inner periphery of the flange 312 to receive the gear ring 106 formed on the outer periphery of the vane support ring 96 and access to the groove 314 is provided by a depression 316 cut into the inside surface 318 of the flange 312 to intersect with the groove 314 as has been shown in FIG. 13. Additionally, a slot 320 is formed through the flange 310 in alignment with the depression 316, as shown in FIG. 17, for a purpose to be described below.

In order to provide for the mounting of the fuel injector 296 on the housing center section 32B, a well 58B is formed in lower portions of the flange 310, as shown in FIG. 13, and a hole 322 is formed through the flange 306 coaxially with the well 58B so that the fuel injector 296 can inject fuel through the hole 322 and through one of the holes 158 and 160 that are cut through the vane support ring 96 to provide an initiation of ignition of a burning fuel within either one of the combustion chambers 154 and 156.

To provide for the introduction of air into the interior of the housing 22B, holes are formed through opposite sides of the flange 306 to form an inlet port 324 and an outlet port 326 positioned identically to the positioning of the inlet port 55 and outlet port 57 of the engine 20 and auxiliary ports 328 and 30 are formed through the flange 312 to align with the inlet and outlet ports, 55 and 57 respectively, for introduction and exhaust of gases into and from the ports 55 and 57.

Coming now to the valving assembly 28B, the valving assembly 28B is comprised of a valving ring 332 that is disposed in the annulus between the tubular members 306 and 308 so that portions of the valve ring 332 can be interposed between the inlet and outlet ports 324 and 326 into the interior of the housing 22B and the auxiliary ports 328 and 330 by means of which gases enter and leave the engine 20B. The valve ring 332 is rotated at one-half the rate of the vane support ring 96 by means of a valve ring drive assembly 334 that has been illustrated in FIGS. 13, 14 and 17. In particular, the valve ring drive assembly is comprised of a first gear 336 positioned within the depression 316 having teeth meshing with the gear ring 106 on the vane support ring 96, as particularly indicated in FIG. 17. The first gear 336 is mounted on a shaft 338 that is journaled in holes (not numerically designated in the drawings) in the parallel flanges 308 and 312 so that rotation of the vane support ring 96 will cause rotation of the first gear 336 and, consequently, the shaft 338. A gear ring 340 is formed on the outside surface 342 of the valve ring 332, as shown in FIG. 17, and the valve ring drive assembly is further comprised of a second gear 344 that is fixed on the shaft 338 to mesh with the gear ring 340 and turn with the first gear 336 in response to rotation of the vane support ring 96. The second gear 344 has only half the number of teeth of the first gear 336 so that a 2:1 gear reduction is effected between the vane support ring 96 and the valve ring 332 in substantially the same manner that a 2:1 gear reduction is effected between the vane support ring 96 and the cam ring 192 of the engine 20.

The analogy between the cam ring 192 and the valve ring 332 is carried further in a manner that causes the engine 20B to operate in the manner described above for the engine 20. In particular, in place of the ridges 212 and 214 with which the cam ring 192 is provided, the valve ring 332 is provided with arcuately extending slots 346 and 348 formed through the wall of the valve ring 332 in the same positions that the ridges 212 and 214 are formed on the inside surface 210 of the cam ring 192. The slot 346 is axially aligned with the inlet port 324, in the same manner that the ridge 212 is aligned with the inlet port 55 in the engine 20, and the slot 348 is axially aligned with the outlet port 326 in the same manner that the ridge 214 is axially aligned with the outlet port 57 in the engine 20 so that, with the 2:1 speed reduction from the vane support ring 96 to the valve ring 332, the valve ring 332 will provide the same opening and closing of the inlet and outlet ports, 324 and 346, that is provided by the poppets 184 and 188 in the engine 20. In order to provide the same timing for the events constituting a four cycle operation of the engine 20B that is provided for the engine 20, a zero position, indicated by the reference marks 350 in FIGS. 15 and 16, is defined for the valve ring 332 in the same manner that zero positions are defined for the vane support ring 96 and the cam 330, as well as for the cam ring 192 in the engine 20, and the engine is initially assembled with the housing 22B, the valve ring 332 and the cam 230 all in the zero positions thereof. Accordingly, the intake and exhaust of gases into the two combustion chambers of the engine 20B will follow the same pattern that has been shown for the engine 20 in the intake and exhaust graphs of FIG. 11 and, further, the fuel injector 296 will be operated at the same 360° and 540° positions of the vane support ring 96 that occurs, as shown on the ignition line 274 of FIG. 11, for the engine 20. As discussed above, the times at which the ignition spikes 282 and 285 occur, so that the times at which the fuel injector 296 is operated, are times at which the first and second combustion chambers, 154 and 156 respectively, are positioned in the housing of the engine to have substantially minimum volume. Thus, injection of fuel into the combustion chambers 154 and 156 at the 360° and 540° positions of the vane support ring 96 that have been indicated in FIG. 11 will result in the initiation of combustion within the chambers at times in which the combustion chambers have maximum compression to result in operation of the engine 20B in the manner of a diesel engine. In order to provide for passage of fuel from the fuel injector 296 from the well 58B into the combustion chambers 154 and 156, the valve ring 332 is provided with ports 352 and 354 that are axially aligned with the hole 322 through the tubular member 306 and the well 58B when the vane support ring 96 is at the 360° and 540° angles of rotation for which ignition is to occur. With respect to the slots 346 and 348 and the reference mark 350 shown in FIGS. 15 and 16, the port 352 is located at a 90° position in a direction 356, in which the valve ring 332 rotates during operation of the engine, from the reference mark 350 and the hole 354 is aligned with the reference mark 350. Thus, when the vane support ring 96 rotates to an angle of 360°, the 2:1 speed reduction between the vane support ring 96 and the valve ring 332 will result in a 180° rotation of the valve ring 332 to bring the hole 352 into alignment with the well 58B. Similarly, when the valve support ring 96 rotates through 540° from the zero position thereof, the 2:1 speed reduction between the vane support ring 96 and the valve ring 332 will cause the valve ring 332 to rotate through 270° to bring the hole 354 into alignment with the well 58B in which the fuel injector 296 is mounted. Accordingly, actuation of the switch 232 for such angles of the vane support ring 96 will result in the initiation of combustion of a fuel mixture in the combustion chambers at the 360° and 540° positions of the vane support ring to result in the delivery of power to the drive shafts 178 and 182 for the segments which have been indicated 284 and 286 on the power graph along line 276 that has been drawn for the operation of the engine 20. Thus, the operation graphs shown in FIG. 11 for the engine 20 apply equally well to the engine 20B so that the engine 20B operates in substantially the same manner as the engine 20, differing substantially only in the inclusion of diesel engine operating characteristics for the engine 20B.

It will be clear that the present invention is well adapted to carry out the objects and attain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. An internal combustion engine, comprising:
   a housing including at least one lobe having a lobe inner surface symmetrically disposed about a lobe axis and conforming to a portion of a spherical surface centered on a lobe center disposed on the lobe axis, wherein a drive shaft aperture intersecting the lobe inner surface is formed through the housing along a drive shaft axis extending radially from the lobe center at an angle to the lobe axis;
   a vane support ring mounted in the housing to extend circularly about the lobe axis for rotation about the lobe axis;
   a vane mounted on the vane support ring for pivotation about a selected diameter of the vane support ring passing through the lobe center, the vane having a sealing surface formed thereon to mate with the lobe inner surface and the sealing surface extending arcuately about the lobe center between opposite ends of said selected diameter of the vane support ring, wherein the vane support ring is characterized as including means for blocking fluid communication between opposite sides of the vane such that the vane divides the interior of the lobe into a first combustion chamber to one side of the vane and a second combustion chamber to the other side of the vane, wherein an intake slot and an exhaust slot are formed through each side of the vane support ring, to either side of said selected diameter, to open into one of said combustion chambers, the inlet slot opening into one combustion chamber being axially aligned with the inlet slot opening into the other combustion chamber and the exhaust slot opening into one combustion chamber being axially aligned with the exhaust slot opening into the other combustion chamber, and wherein an inlet port is formed through the housing in axial alignment with each of said inlet slots and an outlet port is formed through the housing in axial alignment with each of said exhaust slots;
   a drive shaft passing through the drive shaft aperture and pivotally connected to the vane for pivotation relative thereto about an axis passing through the lobe center normally said selected diameter of the vane support ring;
   valving means for opening and closing said inlet port and said outlet port for selected angular positions of the vane support ring about the lobe axis; and
   ignition means for initiating combustion of fuel in one of said combustion chambers for pre-selected angular positions of the vane support ring about the lobe axis.

2. The engine of claim 1 wherein a well is formed in the housing to intersect portions of the inner surface of the housing displaced from the lobe axis in a direction substantially coinciding with the direction of angular displacement of the drive shaft axis from the lobe axis and at an angle to the lobe axis exceeding the angular displacement of the drive shaft axis from the lobe axis; and wherein the ignition means comprises:
   a spark plug mounted in said well; and
   means, mechanically coupled to the vane support ring, for energizing said spark plug for pre-selected positions of the vane support ring about the lobe axis.

3. The engine of claim 1, wherein a well is formed in the housing to intersect portions of the housing inner surface displaced from the lobe axis in a direction substantially coinciding with the direction of the angular displacement of the drive shaft axis from the lobe axis and at an angle to the lobe axis exceeding the angular displacement of the drive shaft axis from the lobe axis; and wherein the ignition means comprises:
   a fuel injector mounted in said well; and
   means, mechanically coupled to the vane support ring, for operating the fuel injector at pre-selected positions of the vane support ring about the lobe axis.

4. The engine of claim 1 wherein the valving means comprises:

an inlet poppet mounted in the inlet port to extend radially away from the lobe axis, wherein the inlet poppet is biased away from the lobe axis to effect closure of the inlet port;

an outlet poppet mounted in the outlet port to extend radially away from the lobe axis, wherein the outlet poppet is biased away from the lobe axis to effect closure of the outlet port;

a cam ring rotatably mounted on the housing to extend in a circle thereabout centered on the lobe axis, the cam ring having ridges formed on the interior surface thereof in axial alignment with the inlet and outlet ports of the housing to engage the poppets and force the poppets inwardly to effect opening of the inlet ports; and cam ring drive means for mechanically coupling the cam ring to the vane support ring for rotation of the cam ring coordinately with rotation of the vane support ring.

5. The engine of claim 4 wherein two ridges are formed on the inner surface of the cam ring, each ridge extending through an angle of substantially 180° so as to open one of the inlet and outlet ports for substantially one-half revolution of the cam ring; and wherein the cam drive means is further characterized as means for rotating the cam ring at one-half the angular velocity of rotation of the vane support ring.

6. The engine of claim 1 wherein the valving means is characterized as comprising:

a valve ring mounted on the housing to overlay the inlet and outlet ports into the housing, the valve ring having two slots formed therethrough, one slot in axial alignment with the housing inlet port and one slot in axial alignment with the housing outlet port; and valve ring drive means, mechanically coupled to the vane support ring, for rotating the valve ring coordinately with the vane support ring.

7. The engine of claim 6 wherein each of the slots through the valve ring extends an angular distance of substantially 180°; and wherein the valve ring drive means is further characterized as a means for turning the valve ring at an angular velocity equal to one-half the angular velocity of the vane support ring.

8. The engine of claim 7 wherein gear teeth are formed on the outer surface of the vane support ring to extend circumferentially thereabout; wherein gear teeth are formed on the outer surface of the valve ring to extend circumferentially thereabout; and wherein the valve ring drive means comprises:

a first gear mounted on the housing to mesh with the gear teeth on the vane support ring; and a second gear mounted on the housing coaxially with said first gear and fixed to the first gear for rotation therewith, the second gear meshing with the gear teeth on the valve ring and having substantially one-half the number of teeth as the first gear for driving the valve ring at one-half the angular velocity of the vane support ring.

9. The engine of claim 1 wherein the housing is characterized as including a second lobe having a second lobe inner surface symmetrically disposed about said lobe axis and conforming to a portion of a spherical surface centered on a second lobe center disposed on the lobe axis within the vane support ring; wherein the means for blocking fluid communication between opposite sides of the vane comprises:

a second vane mounted on the vane support ring for pivotation about a selected diameter of the vane support ring passing through the second lobe center, the second vane having a sealing surface formed thereon to mate with the second lobe inner surface and the sealing surface extending arcuately about the second lobe center between opposite ends of said selected diameter of the vane support ring passing through the second lobe center; and means for forming a dynamic seal between said two vanes; wherein a second drive shaft aperture intersecting the second lobe inner surface is formed through the housing along a second drive shaft axis extending radially from the second lobe center at an angle to the lobe axis, the two drive shaft axes and the lobe axis being disposed co-planarly; and wherein the engine further comprises a second drive shaft, the second drive shaft passing through the second drive shaft aperture and pivotally connected to the second vane for pivotation relative thereto about an axis passing through the second lobe center normally to the selected diameter of the vane support ring about which the second vane pivots.

10. The engine of claim 9 wherein the valving means comprising:

an inlet poppet mounted in the inlet port to extend radially away from the lobe axis, wherein the inlet poppet is biased away from the lobe axis to effect closure of the inlet port;

an outlet poppet mounted in the outlet port to extend radially away from the lobe axis, wherein the outlet poppet is biased away from the lobe axis to effect closure of the outlet port;

a cam ring rotatably mounted on the housing to extend in a circle thereabout centered on the lobe axis, the cam ring having ridges formed on the interior surface thereof in axial alignment with the inlet and outlet ports of the housing to engage the poppets and force the poppets inwardly to effect opening of the inlet ports; and cam ring drive means for mechanically coupling the cam ring to the vane support ring for rotation of the cam ring coordinately with rotation of the vane support ring.

11. The engine of claim 10 wherein two ridges are formed on the inner surface of the cam ring, each ridge extending through an angle of substantially 180° so as to open one of the inlet and outlet ports for substantially one-half revolution of the cam ring; and wherein the cam drive means is further characterized as means for rotating the cam ring at one-half the angular velocity of rotation of the vane support ring.

12. The engine of claim 9 wherein the valving means is characterized as comprising:

a valve ring mounted on the housing to overlay the inlet and outlet port into the housing, the valve ring having two slots formed therethrough, one slot in axial alignment with the housing inlet port and one slot in axial alignment with the housing outlet port; and valve ring drive means, mechanically coupled to the vane support ring, for rotating the valve ring coordinately with the vane support ring.

13. The engine of claim 12, wherein each of the slots through the valve ring extends an angular distance of substantially 180°; and wherein the valve ring drive means is further characterized as a means for turning the valve ring at an angular velocity equal to one-half the angular velocity of the vane support ring.

14. The engine of claim 13 wherein gear teeth are formed on the outer surface of the vane support ring to extend circumferentially thereabout; wherein gear teeth are formed on the outer surface of the valve ring to extend circumferentially thereabout; and wherein the valve ring drive means comprises:
  a first gear mounted on the housing to mesh with the gear teeth on the vane support ring; and
  a second gear mounted on the housing coaxially with said first gear and fixed against rotation with the first gear, the second gear meshing with the gear teeth on the valve ring and having substantially one-half the number of teeth as the first gear for driving the valve ring at one-half the angular velocity of the vane support ring.

* * * * *